W. A. CROWDUS.
STORAGE BATTERY.
APPLICATION FILED APR. 22, 1915.
1,173,651. Patented Feb. 29, 1916.
2 SHEETS—SHEET 1.
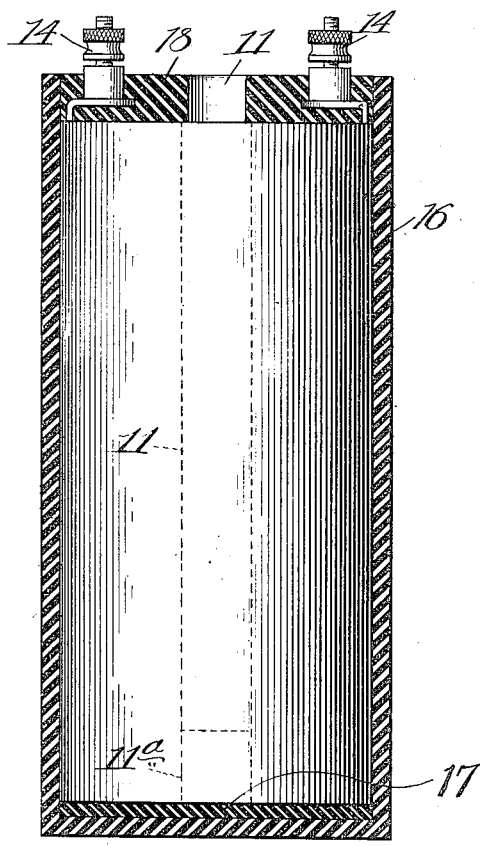
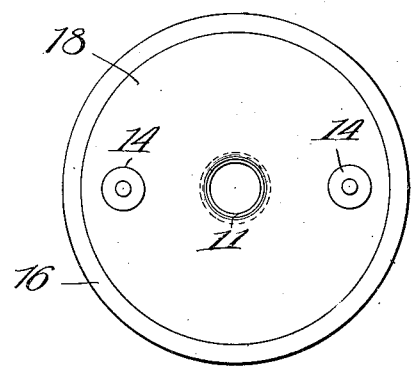
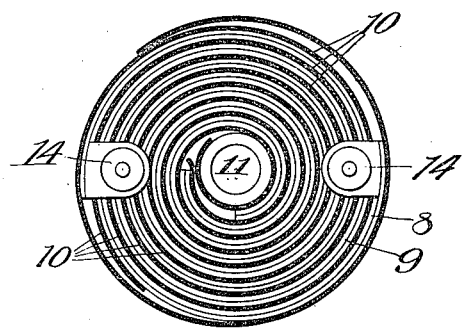
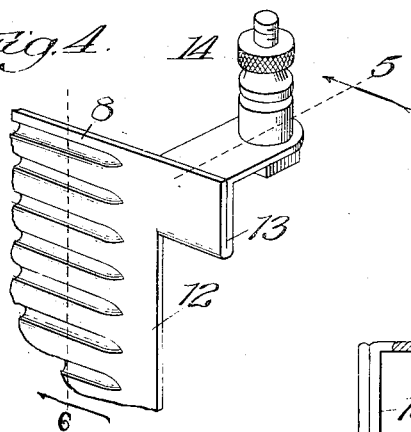
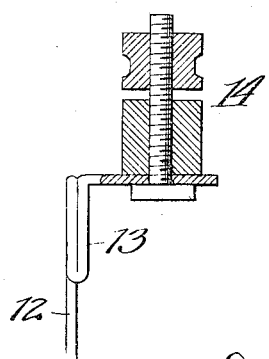
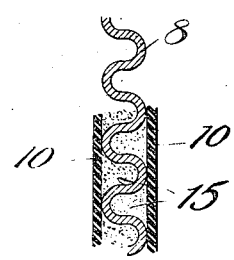
Inventor:
Walter A. Crowdus,
By Dyrenforth, Lee, Chritton & Wiles,
Att'ys.
Witnesses:

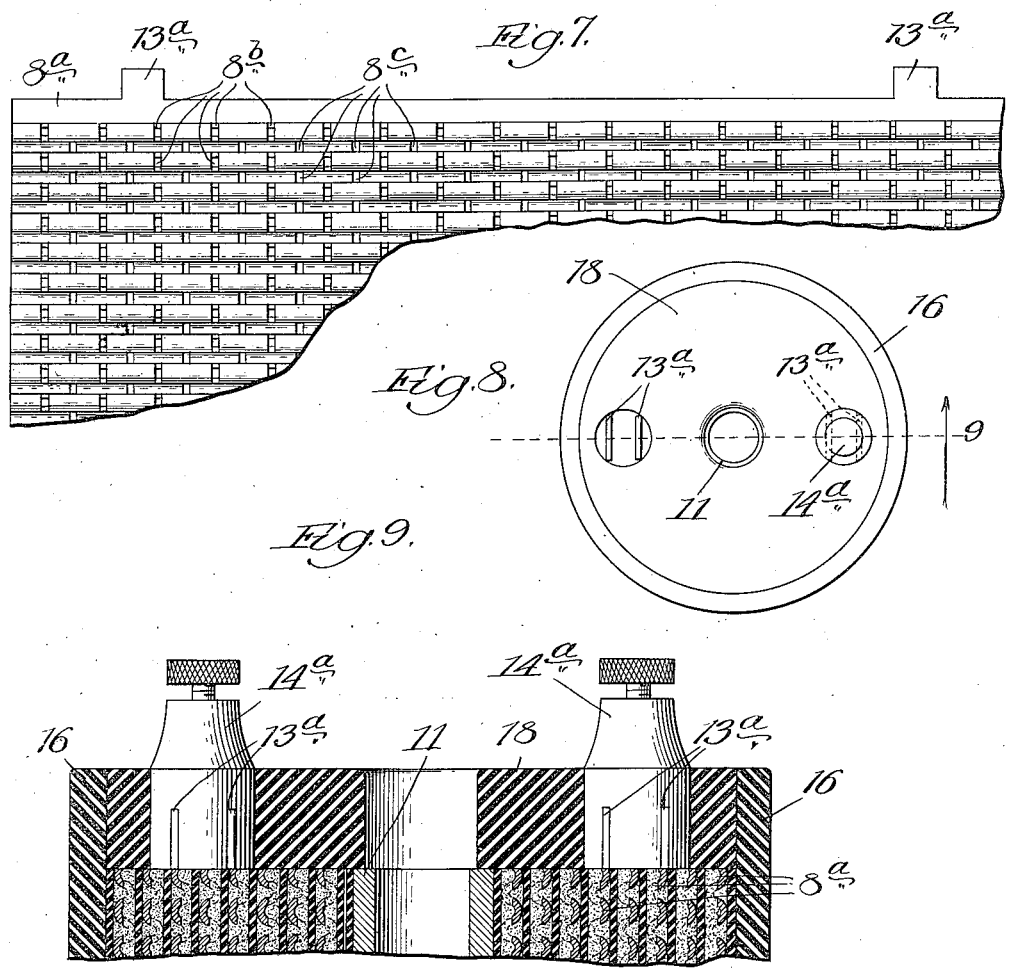

UNITED STATES PATENT OFFICE.

WALTER A. CROWDUS, OF CHICAGO, ILLINOIS, ASSIGNOR TO JOHN P. MENTZER, OF CHICAGO, ILLINOIS.

STORAGE BATTERY.

1,173,651.      Specification of Letters Patent.      Patented Feb. 29, 1916.

Application filed April 22, 1915. Serial No. 23,061.

*To all whom it may concern:*

Be it known that I, WALTER A. CROWDUS, a citizen of the United States, residing at Chicago, in the county of Cook and State of Illinois, have invented a new and useful Improvement in Storage Batteries, of which the following is a specification.

My invention relates to an improvement in the class of so-called dry batteries involving a battery-cell couple having dissimilar elements, between which there is a potential difference, and which is contained in a jar with the necessary liquid electrolyte held in non-flowing or absorbed condition in a suitable porous medium to render it non-spilling.

One object of my invention is to produce, as a commercial article, a secondary battery, in the class referred to, having an original assembly of the parts forming the couple which will enable it to be produced at greatly reduced relative cost, which shall cause it to afford a comparatively large output of current for its weight, and to be exceptionally durable and maintain its capacity through a period as long as or longer than the most expensively constructed secondary battery of the usual plate-type assembly.

Another object is to provide in the sizes and forms of the ordinary zinc-carbon dry primary battery, a secondary battery which, while costing little more than such primary battery to construct, will give a much larger output of current than the latter and be capable of giving off much more power and of discharging continuously or intermittently at a much higher rate of voltage and amperes.

These and other objects are accomplished by the construction illustrated in the accompanying drawing, in which:—

Figure 1 is a view of my improved battery showing the jar and the wax seal in vertical section, and the couple and binding-posts, contained in the jar, in elevation; Fig. 2 is a top plan view of the same; Fig. 3 is a plan view of the complete couple; Fig. 4 is an enlarged perspective view of an end-section of one of the similar metallic elements of the couple; Fig. 5 is an enlarged section on line 5, Fig. 4; Fig. 6 is a similar section one line 6, Fig. 4; Fig. 7 is a broken view in elevation of one of the metallic elements of modified construction; Fig. 8 is a plan view of the battery, like that presented in Fig. 2, but with one binding-post removed and showing a modified construction of the terminals and binding-post; Fig. 9 is a broken view in section on line 9, Fig. 8, and Fig. 10 is an enlarged perspective view of one of the two similar binding-posts shown in Fig. 9.

Referring to Figs. 1 to 6, inclusive, the couple 7 comprises two similar metallic elements, 8 and 9, of suitable flexible sheet-metal, preferably lead, placed flatwise one upon the other with an interposed separator 10 in the form of thin, flexible sheets of porous material, preferably made of chemically treated and cooked wood-fibers, the whole being spirally coiled about a hollow central core 11, which may be a tube of hard rubber or other suitable material. Each sheet 8 and 9 is fluted, crimped or corrugated longitudinally, as shown, between its ends, to leave each end-section, like that shown at 12 in Fig. 4 blank; and the end-section is cut away to a point short of the upper edge of the metal strip. This severed portion is folded on itself, as shown at 13 in Figs. 4 and 5, and bent to extend at a right-angle to the folded length for carrying on the terminal-arm a threaded post, on which is screwed a thimble and a nut to form the binding-post 14. The advantage of this construction lies in rendering the terminals integral with the metal elements, thus avoiding lead-burning of a separate piece on the element.

The longitudinal corrugations form pockets, shelves, or interstices for receiving, supporting and confining the mechanically applied or pasted active material, or material to be rendered active, 15. The fluted construction for thus supporting this material is preferred, because it is inexpensive to produce by machinery and affords a large extent of active surface, thereby enhancing the efficiency of the couple; and, as will be understood by those skilled in the art, this fluted form of the sheet-metal elements lends itself readily to the Plante type of battery-couple. My improvement is therefore not to be understood to be limited in its use to either type of battery, for I may, for different purposes, apply it to the paste type or to the electro-chemically formed (Plante) type. This pocket-like confinement for the active material may also be provided in my coil-form of couple otherwise than by longitudinally fluting, crimping, or corrugating the sheets 8 and 9, and I desire to be understood as including all such manner of confinement as within my invention.

As will be understood, the material 15 is applied to the sheets 8 and 9 before they are imposed flatwise one upon the other, with the separating sheets between them. In the process of manufacture, immediately the opposing elements are pasted and while the applied paste is soft and pliable, or before it has set or hardened, they are assembled flatwise with the separating sheets between and rolled or wound under pressure in a suitable machine for producing the couple in the desired coil form and are then, in their assembled form, dried or aged.

The finished couple 7 fits in a jar 16, which may be of hard rubber, and rests on a pad 17 of absorbent material (which may be the same as that of the porous separator 10), in the cell-bottom, to which, however, the core 11 does not reach, thus to provide a space 11$^a$ from which the liquid electrolyte, filled into the cell through the core, may be readily absorbed by the porous separator throughout the couple and thus gain access to the material 15. The cell is sealed with a coating of suitable wax 18 extending over the couple 7 about the upper end of the core 11.

The flexible absorbent separator 10 is an important feature of my improvement for use between the metallic pocket-forming elements 8 and 9. It is composed of ground wood-fiber, chemically treated to remove the contained acids and gums, preferably by cooking it in a caustic alkali solution; and I then bleach it by subjecting it to sulfurous acid fumes to remove any coloring foreign matter carried thereby. These fibers are incorporated in sheet-form, substantially in the manner of manufacturing paper out of wood-pulp. This chemical treatment of the fibers renders the separator highly resistant to carbonization by the electrolyte. The resultant product is very flexible and porous and is peculiarly adapted to my purpose, since, by reason of its flexibility and toughness, it rolls in continuous sheets compactly between the metallic elements in spirally coiling them, and is so highly capillary as to quickly absorb the liquid electrolyte and distribute it throughout the couple. Moreover, the absorbed liquid so swells the separator as to compress and cushion it against the active material and not only hold the latter securely in place but in close and effective contact with the surfaces of the metallic elements, I have further found that by the pressure thus exerted by the separator against the material 15 to hold it in place against its conducting support, I am enabled to use for the negative element aluminum as the metal composing it, which has the advantages of lightness and thus of reducing the weight of the battery to a very considerable extent.

The construction of the metallic element 8$^a$ shown in Fig. 7 differs from that of either element 8 or 9, as shown in Fig. 4, in having the raised portions of the corrugations on the opposite faces of the element cut away or slotted at intervals, as shown at 8$^b$ and 8$^c$. The slots in each longitudinal series in one face of the element should be staggered relatively to those in the corresponding series in the opposite face, as represented. Without being thus slotted, the metallic element is out of proportion in the matter of relative weight of lead and active material. By providing the slots or openings in the raised portions of the corrugations, a portion of the lead of each element is removed and additional active material is substituted therefor in the receptacles for it which the slots afford, whereby the lead and active material are better proportioned, and, besides, the advantage is afforded of increasing the amount of active material in the couple and the capacity of the latter.

The modified construction further differs from that shown on Sheet 1 of the drawings in providing terminals 13$^a$. In this construction, the metallic sheet is left blank along its upper portion and the leads or terminals 13$^a$ are cut out at such intervals as to cause them to coincide radially, in a pair on each element, when the sheets are coiled. The type of connector 13, 14, shown in Fig. 4 is more especially designed for use on the smaller sizes of my battery, wherein the current capacity is likewise smaller; but in the larger sizes, wherein the current-capacity demands a larger cross-section of terminal, the form shown in Figs. 7 to 10, inclusive, is more desirable. In this form the radially alining leads 13$^a$ on each metallic element enter and are burned or soldered in parallel slots 14$^b$ (Fig. 10) in the lower part of a binding-post 14$^a$. Only two of these vertical leads are shown, but for batteries of still larger capacity, three or more may be provided, and the slots 14$^b$ in the binding-posts are then increased correspondingly.

What I claim as new and desire to secure by Letters Patent is:—

1. A storage-battery couple comprising metallic sheets and interposed separator-sheets of flexible, porous material, closely contacting with the active material, or material to be rendered active throughout the surfaces of the latter, the whole being wound into a spiral 2. A storage-battery couple, comprising metallic sheets provided with active material, or material to be rendered active, porous absorbent separators interposed between said metallic sheets and closely contacting with said material throughout its surfaces, and a hollow core in the couple, communicating with said separators for supplying liquid to the battery and adapted, when the cell is being charged, to receive expelled electrolyte.

3. A storage-battery couple, comprising metallic sheets provided with active material, or material to be rendered active, porous absorbent separators interposed between said metallic sheets and closely contacting with said material throughout its surfaces, said metallic sheets and the porous absorbent separators interposed between the same being wound into a spiral, and a hollow core in the couple, communicating with said separators for supplying liquid to the battery and adapted, when the cell is being charged, to receive expelled electrolyte.

4. A storage-battery couple comprising metallic sheets each having an upper blank section with leads or terminals integral with and projecting at intervals from its edge, and interposed separator-sheets of flexible, porous material, said sheets being wound into a spiral and said leads being disposed on each metallic sheet to extend in paired radial alinement in the spiral.

5. A storage-battery couple comprising longitudinally corrugated metallic sheets, the corrugations forming pockets for the active material, or material to be rendered active, and interposed separator-sheets of flexible, porous material, the whole being wound into a spiral.

6. A storage-battery couple comprising longitudinally corrugated metallic sheets slotted at intervals crosswise of the corrugations, the slotted corrugations forming pockets for the active material, or material to be rendered active, and interposed separator-sheets of flexible, porous material, the whole being wound into a spiral.

7. A storage-battery couple comprising longitudinally corrugated metallic sheets provided with transverse series of slots at intervals through the corrugations, the series of slots in one face of each sheet being in staggered relation to those in the opposite face, the slotted corrugations forming pockets for the active material, or material to be rendered active, and interposed separator-sheets of flexible, porous material, the whole being wound into a spiral.

8. A storage-battery couple comprising longitudinally corrugated metallic sheets, the corrugations forming pockets for the active material, or material to be rendered active, interposed separator-sheets of flexible, porous material, all of said sheets being wound into a spiral and forming a central opening in the couple, and a tubular core extending partway through said opening and forming a space in the latter at the inner end of the tubular core for liquid electrolyte.

9. A storage-battery couple comprising a pair of metallic sheets, one of said sheets being composed of aluminum and forming the spongy-lead support, and a separator of flexible, porous material interposed between the metallic sheets, the whole being wound into a spiral.

10. A storage-battery couple comprising a pair of longitudinally corrugated metallic sheets, the corrugations forming pockets for the active material, or material to be rendered active, one of said sheets being composed of aluminum and forming the spongy-lead support, and a separator of flexible porous material interposed between the metallic sheets and wound therewith into a spiral.

WALTER A. CROWDUS.

In presence of—
O. C. Avisus,
A. C. Fischer.